(12) United States Patent
Wolf et al.

(10) Patent No.: US 7,906,454 B2
(45) Date of Patent: Mar. 15, 2011

(54) EXHAUST GAS CLEANING CATALYST WITH AN AXIALLY VARYING PRECIOUS METAL CONCENTRATION AND PROCESSES FOR MAKING THE CATALYST

(75) Inventors: Anke Wolf, Darmstadt (DE); Dieter Lindner, Hanau (DE); Matthias Feger, Darmstadt (DE); Martin Roesch, Rodgau (DE); Egbert Lox, Grebenhain (DE); Thomas Kreuzer, Karben (DE)

(73) Assignee: Umicore AG & Co. KG, Hanau-Wolfgang (DE)

( * ) Notice: Subject to any disclaimer, the term of this patent is extended or adjusted under 35 U.S.C. 154(b) by 957 days.

(21) Appl. No.: 10/588,943

(22) PCT Filed: Jan. 18, 2005

(86) PCT No.: PCT/EP2005/000450
§ 371 (c)(1), (2), (4) Date: May 31, 2007

(87) PCT Pub. No.: WO2005/077497
PCT Pub. Date: Aug. 25, 2005

(65) Prior Publication Data
US 2007/0264518 A1 Nov. 15, 2007

(30) Foreign Application Priority Data
Feb. 11, 2004 (EP) .................... 04003040

(51) Int. Cl.
B01J 23/00 (2006.01)
B01J 21/00 (2006.01)
B01D 50/00 (2006.01)
B01D 53/34 (2006.01)
B21D 39/00 (2006.01)
B32B 3/12 (2006.01)

(52) U.S. Cl. ........ 502/327; 502/326; 502/332; 502/333; 502/334; 502/339; 502/439; 422/177; 422/180; 428/593

(58) Field of Classification Search .................. 502/326, 502/327, 332, 333, 334, 339, 439; 422/170–180; 428/593
See application file for complete search history.

(56) References Cited

U.S. PATENT DOCUMENTS 4,417,908 A * 11/1983 Pitcher, Jr. ...................... 55/523
(Continued)

FOREIGN PATENT DOCUMENTS
WO    WO 01/74476 A    10/2001

OTHER PUBLICATIONS
International Search Report.
(Continued)

*Primary Examiner* — Cam N Nguyen
(74) *Attorney, Agent, or Firm* — Kalow & Springut LLP; William D. Schmidt

(57) ABSTRACT

The present invention relates to an exhaust gas cleaning catalyst comprising on a honeycomb carrier a catalytic coating. Said honeycomb carrier has an upstream end and a downstream end and a plurality of flow channels are running from the upstream end to the downstream end. The catalytic coating comprises catalytically active precious metal components of which at least one component exhibits a concentration profile along the honeycomb carrier starting with a low concentration at the upstream end which increases along the flow channels up to a maximum value and then decreases again to the downstream end.

19 Claims, 3 Drawing Sheets

U.S. PATENT DOCUMENTS

| | | | | |
|---|---|---|---|---|
| 4,420,316 | A * | 12/1983 | Frost et al. | 55/523 |
| 5,510,086 | A | 4/1996 | Hemingway et al. | |
| 6,087,298 | A * | 7/2000 | Sung et al. | 502/333 |
| 7,276,212 | B2 * | 10/2007 | Hu et al. | 422/177 |
| 7,524,465 | B2 * | 4/2009 | Kumar et al. | 422/180 |
| 7,655,195 | B1 * | 2/2010 | Ichikawa et al. | 422/180 |
| 2002/0022272 | A1 * | 2/2002 | Kumar et al. | 436/37 |
| 2002/0131914 | A1 * | 9/2002 | Sung | 422/177 |
| 2003/0061860 | A1 * | 4/2003 | Hu et al. | 73/23.31 |
| 2003/0124037 | A1 * | 7/2003 | Voss et al. | 422/177 |
| 2003/0154713 | A1 * | 8/2003 | Hiratsuka et al. | 60/297 |
| 2004/0001781 | A1 * | 1/2004 | Kumar et al. | 422/180 |
| 2004/0001782 | A1 | 1/2004 | Kumar et al. | |
| 2004/0166036 | A1 * | 8/2004 | Chen et al. | 422/180 |
| 2004/0219077 | A1 * | 11/2004 | Voss et al. | 422/177 |
| 2006/0251549 | A1 * | 11/2006 | Kumar et al. | 422/180 |
| 2009/0042722 | A1 * | 2/2009 | Hu et al. | 502/304 |

OTHER PUBLICATIONS

Written Opinion.

* cited by examiner

EXHAUST GAS CLEANING CATALYST WITH AN AXIALLY VARYING PRECIOUS METAL CONCENTRATION AND PROCESSES FOR MAKING THE CATALYST

BACKGROUND OF THE INVENTION

The present invention relates to the field of exhaust gas cleaning of internal combustion engines. Specifically the invention provides an improved catalyst exhibiting superior performance with respect to poisoning and thermal damage. The invention also provides a process for manufacturing this catalyst.

In the following the invention will be explained with reference to three-way catalysts for cleaning the exhaust gases of stoichiometrically operated gasoline engines. But it should be kept in mind that the underlying principle of the invention is equally well applicable for so-called lean burn and diesel engines.

Three-way catalysts are primarily used to convert the pollutants carbon monoxide (CO), hydrocarbons (HC) and nitrogen oxides ($NO_x$) contained in the exhaust gas of internal combustion engines into harmless substances. Known three-way catalysts with good activity and durability utilize one or more catalytic components from the platinum group metals such as platinum, palladium, rhodium and iridium deposited on a high surface area, refractory oxide support, e.g., a high surface area alumina. The support is usually carried in the form of a thin layer or coating on a suitable carrier or substrate such as a monolithic carrier comprising a refractory ceramic or metal honeycomb structure.

The ever increasing demand for improved catalyst activity and life has led to complex catalyst designs comprising multiple catalyst layers on the carrier structures, each of the layers containing selected support materials and catalytic components as well as so called promoters, stabilizers and oxygen storage compounds.

U.S. Pat. No. 5,010,051 describes a catalyst composition having an upstream stage and a down-stream stage, the upstream stage containing a catalytic material which is different from the catalytic material contained on the downstream stage and is characterized by having a low ignition temperature, e.g., 350° C. to less than 400° C., for the substantially simultaneous conversion of HC, CO and NOx pollutants contained in, e.g., the exhaust of an automobile engine operating at a substantially stoichiometric air-to-fuel weight ratio. The downstream catalytic material is characterized by having a higher conversion efficiency for substantially simultaneous conversion of HC, CO and NOx than the upstream catalytic material at elevated operation temperatures which may be, for example, from about 400 to 800° C.

The U.S. Pat. No. 6,087,298 discloses an exhaust gas treatment catalytic article having an upstream catalytic zone and at least one downstream catalytic zone. The upstream catalytic zone has an upstream composition which has a first upstream support, and at least one first upstream palladium component. The upstream zone can have one or more layers. The downstream catalytic zone has a first downstream layer which has a first downstream support and a first downstream precious metal component. A second downstream layer has a second downstream support and a second downstream precious metal component.

Exhaust gas cleaning catalysts are subjected to high temperatures and exhaust gas components such as sulfur, lead and phosphorous which tend to poison the catalyst especially at the upstream end of the catalyst. Thermal damage is due to the fact that in order to have a light off of the catalysts as early as possible they are placed nearer and nearer to the engine outlet. Thus, during normal operation the upstream end of the catalysts experiences very high temperatures. This results in thermal damage to the catalyst gradually proceeding from the upstream end to the downstream end.

Based on the foregoing there is a need in the art for improving thermal resistance and poisoning resistance of exhaust gas cleaning catalysts especially at the upstream end of these catalysts. It is therefore an object of the present invention to provide such a catalyst and a process for its manufacture.

SUMMARY OF THE INVENTION

The present invention is based on the observation that thermal damage and poisoning of the catalyst coating starts at the upstream end of the exhaust gas cleaning catalysts. It has been found that by lowering the concentration of the precious metal components at the upstream end of the catalyst carrier and at the same time increasing the concentration more downstream catalyst life can be improved.

Therefore, the present invention relates to a catalyst for the conversion of automotive exhaust gases comprising a concentration profile of the catalytically active components along the longitudinal axes of a honeycomb carrier as well as a process for producing it. The invention provides an improved catalyst exhibiting superior performance with respect to poisoning and thermal damage.

BRIEF DESCRIPTION OF THE FIGURES

The invention will now be described in connection with preferred embodiments and with reference to the accompanying figures. The figures show:

FIG. 5: Concentration profile of rhodium in a single layer rhodium gradient catalyst of example 3

DETAILED DESCRIPTION OF THE PREFERRED EMBODIMENTS

Figure 1:
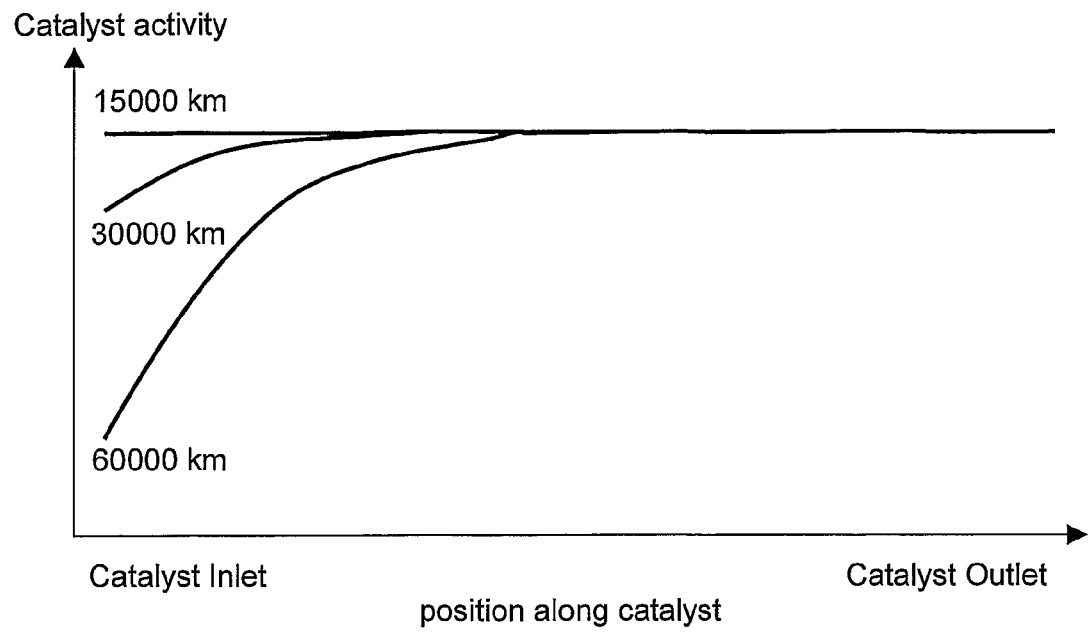
FIG. 1: Degradation of catalyst activity along a catalyst after a mileage of the vehicle of 15000, 30000 and 60000 kilometers

FIG. 1 shows schematically the catalyst activity along the axial dimension of a conventional homogeneous monolithic honeycomb carrier catalyst after exposure to the exhaust gas of a vehicle. The term "homogeneous" is used herein to designate a catalyst with a constant precious metal concentration along its axis. After 15000 kilometers of driving, the catalyst activity is hardly affected. But with increasing mileage, catalyst activity starts to degrade from the catalyst inlet. FIG. 1 shows this behavior exemplarily for mileages of 30000 and 60000 kilometers.

Figure 2:
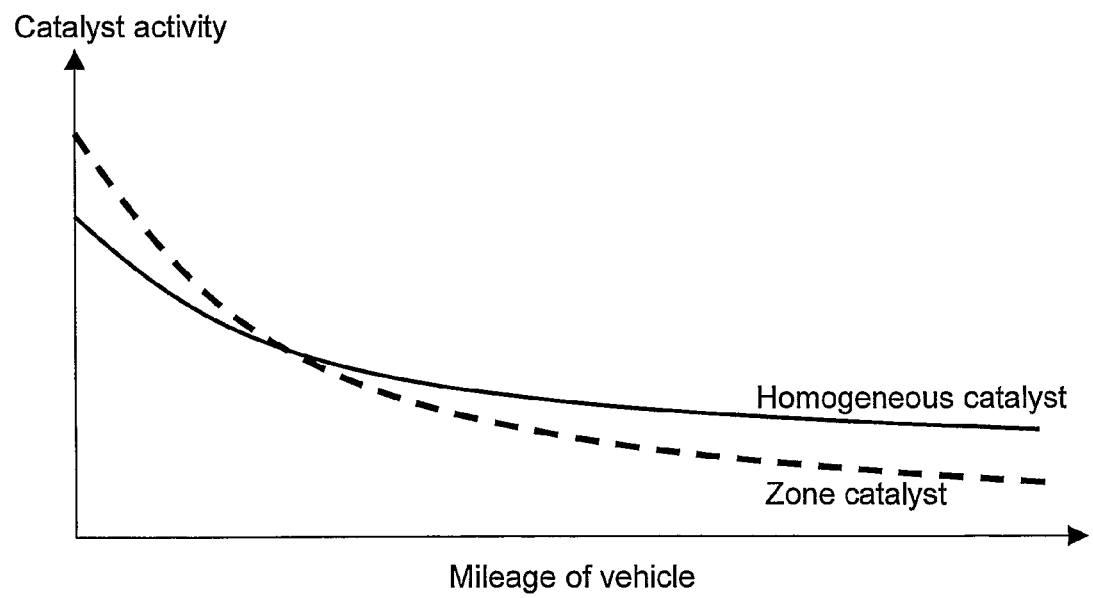
FIG. 2: Degradation of overall catalyst activity versus mileage of a vehicle for a homogeneous and a conventional zone catalyst

FIG. 2 gives schematically the catalyst activity versus mileage for a conventional zone catalyst having a high precious metal concentration in a first upstream zone and for a homogeneous catalyst, i.e. for a catalyst with a constant precious metal concentration along its axial dimension under the assumption that both catalysts have the same overall precious metal loading. FIG. 2 shows that the advantages of a zone catalyst may strongly depend on the degree of aging. In the beginning the zone catalyst is superior in activity over the homogeneous catalyst due to the high precious metal concentration in the first upstream zone which leads to an improved light-off behavior. But with increasing life the zone catalyst degrades faster than the homogeneous catalyst. This is again attributed to the fact that the conventional zone-catalyst has the major portion of its precious metal loading in a small upstream zone which is exposed to high temperatures and poisoning components. Thus, such a catalyst is subject to a higher loss of precious metal surface than a homogeneous catalyst.

The catalyst according to the invention tries to remedy these drawbacks of zone catalysts. The catalyst according to the invention comprises a honeycomb carrier coated with a catalytic coating. Said honeycomb carrier has an upstream end and a downstream end and a plurality of flow channels running from the upstream end to the downstream end. The catalytic coating comprises at least one catalytically active precious metal component which exhibits a varying concentration profile along the axis of the honeycomb carrier. With respect to this concentration profile three abutting regions of the honeycomb carrier are distinguished. The first or upstream region exhibits a low concentration of the respective precious metal component while the second or intermediate region exhibits a maximum concentration. The third or downstream region has a concentration of the precious metal component which is equal or lower than the maximum concentration in the second region.

Coating a honeycomb carrier with a catalytic coating means applying the coating material to the surfaces of the walls defining the flow channels. Coating of the outer jacket surface of the carrier would be a waste of expensive coating material and has to be avoided as far as possible. The technics for coating honeycomb carriers are well known to the expert and will not be explained in detail here. The coating concentration referred to above is equal to the totally applied dry material divided by the overall volume of the honeycomb carrier. The coating concentration usually is given in grams per liter of the carrier.

The honeycomb carrier suitable for this invention may be manufactured from ceramic or from metal foils. The cell density, that is the number of flow channels per cross section of the carrier, may lie within 10 and 200 $cm^{-2}$. The outer dimensions of the honeycomb carriers depend on the internal combustion engine for which they are intended. Carriers with diameters between 50 and 150 mm and with lengths between 25 and 300 mm are conventional.

The optimized distribution of the catalytically active components according to this invention enables to fulfill different demands for the catalytic conversion in different regions of the catalyst. For example, in three way catalysts (TWC), where the simultaneous conversion of carbon monoxide (CO), hydrocarbons (HC) and nitrogen oxides (NOx) has to be realized in an exhaust gas with stoichiometric air-to-fuel ratio, the time which is needed to achieve the operating temperature is a critical parameter.

Conventional zone catalysts comprise a higher amount of precious metal (mostly palladium) in the upstream zone than in the downstream zone and therefore provide an improved light off behavior as well as a reduction of precious metal content compared to homogeneously coated catalysts.

However, during operation the upstream end of the catalyst is exposed to extremely high temperatures and therefore the thermal damage of the catalysts is gradually proceeding from the upstream to the downstream end. Moreover phosphorous, zinc or calcium species being present in the exhaust gas tend to poison the catalyst especially at the upstream end.

The present invention provides a catalyst with higher resistance of the catalytic activity to thermal aging and poisoning. The first or upstream region of the catalyst is equipped with only a low concentration of the precious metal component. Thus, damage of catalytic activity in this region due to poisoning and thermal stress will only affect the overall catalytic activity of the catalyst to a minor extent.

Investigations of the inventors have shown that the first region which is exposed to high poisoning has a length of approximately 5 to 20 mm. For example, the phosphorous concentration in the catalyst after 240000 kilometers (150000 miles) of road aging is highest at the inlet face and drops sharply with increasing distance from the inlet face. The first 13 mm of the catalyst contained more than 50% of the total phosphorous content of the catalyst.

Thus, the first region of the catalyst according to this invention is contemplated to have a length of between 5 and 20 mm. Abutting to this region is the second region which has a length of from 10 to 100 mm.

As already pointed out, the first region exhibits a reduced concentration of the precious metal. Preferably the average concentration of the precious metal component with varying concentration profile in this region amounts to 10 to 60% of the maximum concentration in the second region and the average concentration in the third region is of from 0 to 100% the maximum concentration in the second region. Thus, in a special embodiment of the catalyst the third region may be totally free from precious metal.

Due to its high resistance to thermal stress and poisoning the catalyst of the invention is most suitable for being used as a close coupled catalyst, that is the catalyst is especially suitable to be positioned close to the exhaust manifold of an internal combustion engine where the catalyst is quickly heated up after cold start but also experiences high temperature stresses during normal driving conditions. Such catalysts usually employ palladium as the major catalytic component which serves to promote oxidation of unburnt hydrocarbons in the exhaust gas.

Therefore, in the catalyst of the invention, it is most preferred to use palladium as the precious metal component with varying concentration profile. To achieve quick light off of the catalyst the palladium concentration in the second region is especially high. The maximum concentration of palladium in this second region can be from 0,1 to 100 g/l of volume of the honeycomb carrier.

The palladium concentration (or that of other precious metals) can be constant within the individual regions i.e. the concentration profile has a step like appearance. But it is most preferred to have a continuous concentration profile of the palladium along the honeycomb carrier with the lowest concentration at the inlet face of the catalyst and then with a steep increase to a peak concentration in the second region. In the second region the palladium burns the unburnt hydrocarbons contained in the exhaust gas and due to the heat released by this reaction the third region of the catalyst is forcibly heated. This results in a low light off temperature of the overall catalyst.

The great advantage of this catalyst is that the concentration of the palladium in the second region can be made unconventionally high such us up to 100 g/l and even beyond without increasing the production costs of the catalyst too much because the second region with high palladium content can be made quite narrow.

It is preferred that the catalytic coating of the catalyst further comprises additional precious metal components selected from the group consisting of platinum, rhodium, iridium or mixtures thereof. These additional components render the catalyst with a three-way catalytic performance. These additional components may have the same concentration profile as palladium but with different absolute concentrations. But the additional precious metal components may also have the same constant concentration within all three regions of the catalyst. Preferably the additional precious metal components are platinum and rhodium with platinum and rhodium being present in a concentration of from 0,05 to 5 g/l volume of the honeycomb carrier.

In a most preferred embodiment the catalytic coating with the varying concentration profile forms a first coating on top of which is provided a second catalytic coating and said second catalytic coating comprises the additional precious metal components with constant concentration along the honeycomb carrier.

The gradient catalyst according to the invention can produced by first applying a uniform high surface area support layer to a conventional honeycomb carrier by well known technics in the art. Thereafter the catalytically active component(s) are introduced into the support layer by impregnating this layer with solutions containing precursor compounds of the catalytically active component(s). For generating the desired concentration profile of the catalytically active component(s) along the carrier axis, the honeycomb carrier with the support layer is treated in selected regions with a wetting agent before the impregnation step. To reduce the concentration of the catalytically active components in the first upstream zone at least this first upstream zone has to be treated with the wetting agent before impregnation. Finally the impregnated honeycomb carrier is dried and calcined in order to transform the precursors of the catalytically active components into their catalytically active state.

In an alternative procedure, the honeycomb carrier can first be supplied with a support layer having a uniform concentration of the desired catalytically active component(s). Thereafter a varying concentration profile of the catalytically active component(s) can be imposed onto the uniform concentration profile by applying the impregnation technic described above.

The wetting agent for producing the concentration profile should lower the absorption of the precious metal precursors by the support layer during impregnation. The wetting agent is preferably water or an aqueous solution of an organic compound. The organic compound is preferably selected from the group consisting of polyethylene glycol, citric acid, polyvinyl alcohol, isopropanol or mixtures thereof. The organic compound should easily be volatilized and/or decomposed leaving little or no residue behind after the final calcination step of the impregnated honeycomb carrier.

In detail, a process for manufacturing an exhaust gas cleaning catalyst according to the present invention comprises the following steps:
a) coating a honeycomb carrier with a slurry comprising at least one high surface area support material for the precious metal components, drying and calcining this coating to obtain a support layer,
b) wetting the first upstream region of the carrier with a wetting agent,
c) impregnating the first and second region of the carrier with a solution of at least one precursor compound of the precious metal components,
d) drying the impregnated support layer by conducting a stream of heated air through the honeycomb carrier, thereby forming a continuous concentration profile with a low precious metal concentration at the upstream end, and
e) calcining and optionally reducing the precious metal components in a hydrogen containing gas stream.

The above described process provides the possibility to obtain a variety of different precious metal profiles along the honeycomb carrier with essential no precious metals in the third downstream region.

The heated air stream in step d) may be conducted through the catalyst from the exhaust inlet side to the exhaust outlet side or in the inverse direction. Depending on the ability of the precious metal precursors used for impregnation to adsorb poorly or strongly to the support layer, different precious metal profiles can be obtained along the axial dimension of the catalyst. The optimum profile depends on the envisaged application and can be determined by the expert through experimentation.

On top of the inhomogeneous coating can be applied a second coating containing e.g. platinum and rhodium homogeneously distributed along the total length of the honeycomb carrier.

In case it is desired to provide also the third region of the first coating with a certain concentration of precious metals then the following alternative production procedure can be used. This alternative process has the following process steps:
a) coating a honeycomb carrier with a slurry comprising at least one high surface area support material and a precious metal component, drying and calcining this coating to obtain an already catalytically activated support layer,
b) wetting the first region of the carrier with a wetting agent,
c) impregnating the first and second region of the carrier with a solution of at least on precursor compound of the precious metal component,
d) drying the impregnated support layer by conducting a stream of heated air through the honeycomb carrier, thereby forming a continuous concentration profile with a low precious metal concentration at the upstream side, and
e) calcining and optionally reducing the precious metal component in a hydrogen containing gas stream.

This process yields a precious metal concentration along the honeycomb carrier which is essentially constant within the third region.

In case it is desired to provide also the third region of the first coating with a concentration profile of precious metals then the following alternative production procedure can be used. This third process has the following process steps:
a) coating a honeycomb carrier with a slurry comprising at least one high surface area support material for the precious metal component, drying and calcining this coating to obtain a support layer,
b) wetting the first and the third region of the carrier with a wetting agent,
c) impregnating either the complete carrier with a solution of at least one precursor compound of the precious metal component in one step, or in a first impregnation step the first and second region and in a second impregnation step the third and the second region of the carrier,
d) drying the impregnated support layer by conducting a stream of heated air through the honeycomb carrier, thereby forming a continuous concentration profile with a low precious metal concentration at the upstream side, and
e) calcining and optionally reducing the precious metal component in a hydrogen containing gas stream.

By choosing the length of the respective regions symmetric or asymmetric profiles can be achieved.

In all embodiments of the process for manufacturing the catalyst the impregnation solution for the precious metal component can comprise a poorly or strongly adsorbing precursor compound of the precious metal component. In case the precious metal component with a concentration profile is selected to be palladium then a suitable poorly adsorbing precursor compound is palladium tetraammine nitrate Pd(NH$_3$)$_4$(NO$_3$)$_2$, and a suitable strongly adsorbing precursor compound is palladium nitrate Pd(NO$_3$)$_2$.

EXAMPLES

Example 1

Preparation of a Single Layer Catalyst with a Palladium Gradient.

Figure 3:
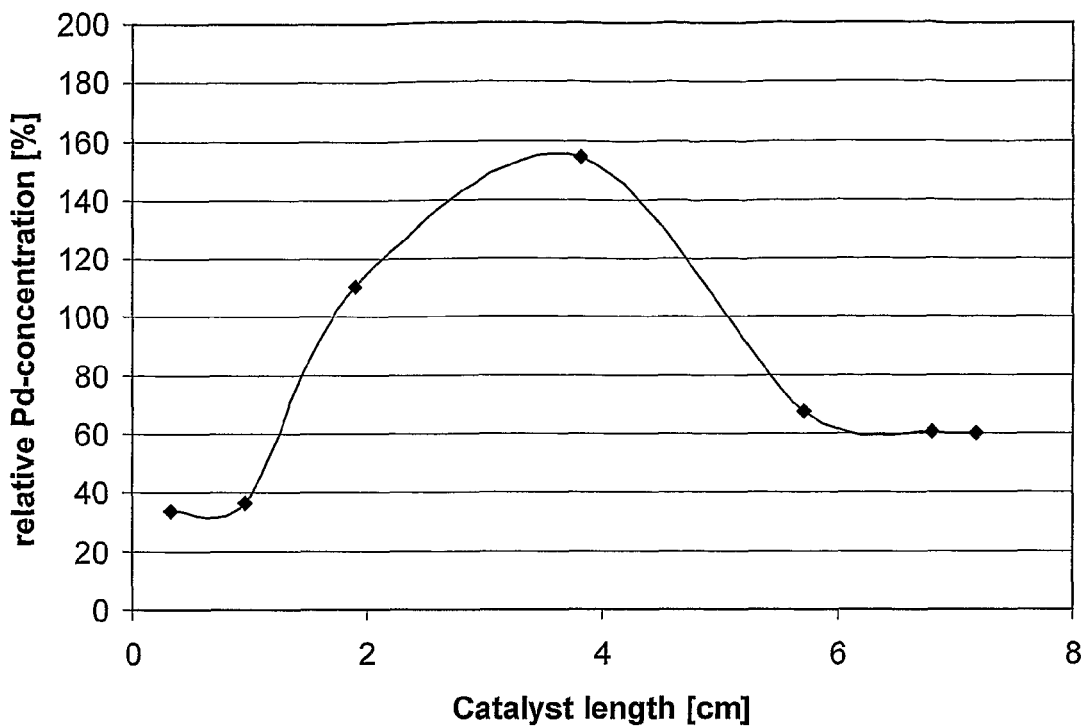
FIG. 3: Concentration profile of palladium in a single layer palladium gradient catalyst of example 1

A monolithic honeycomb carrier with a total length of 76,2 mm (3 inch) was coated with an alumina based precious metal free washcoat. The coated substrate was dried at 120° C. and calcined at 500° C. in air. Subsequently, the first 15,2 mm (0,6 inch) from the upstream end as well as the first 25,4 mm (1 inch) from the downstream end were dipped into a solution of polyethylene glycol. Thereafter the complete substrate was impregnated with a palladium nitrate solution and immediately dried in a continuous air stream at 120° C. to obtain a concentration profile of palladium as shown in FIG. 3. The substrate was loaded with 120 g/l washcoat and 1,41 g/l palladium.

Figure 4:
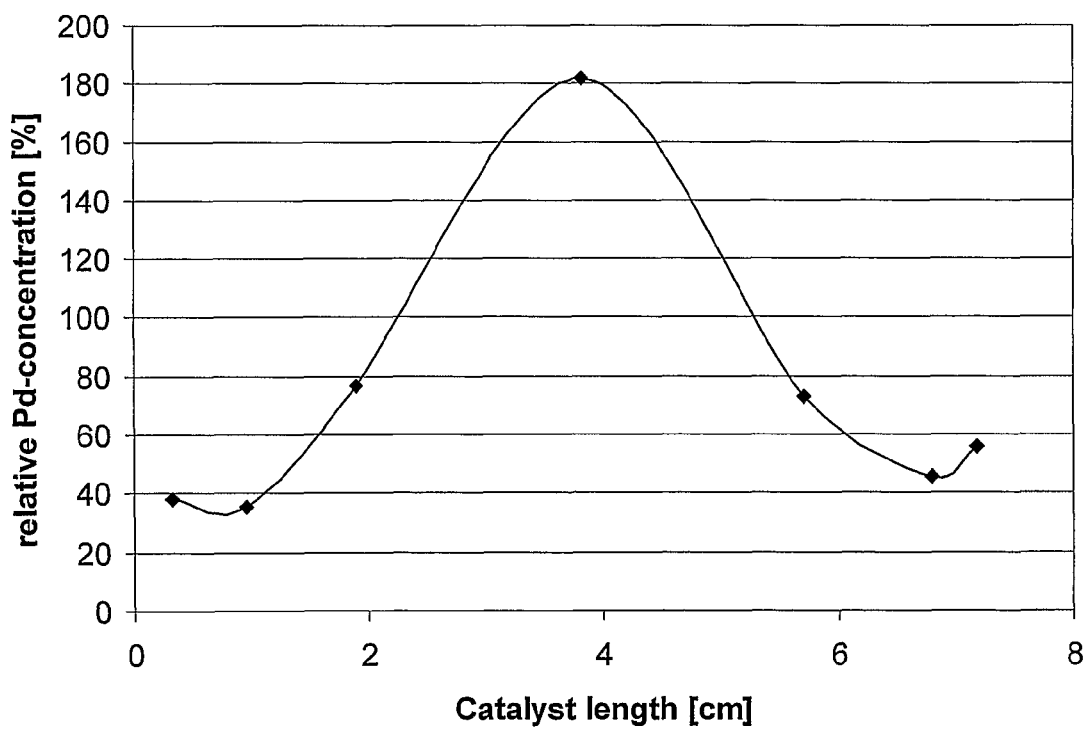
Figure 5:
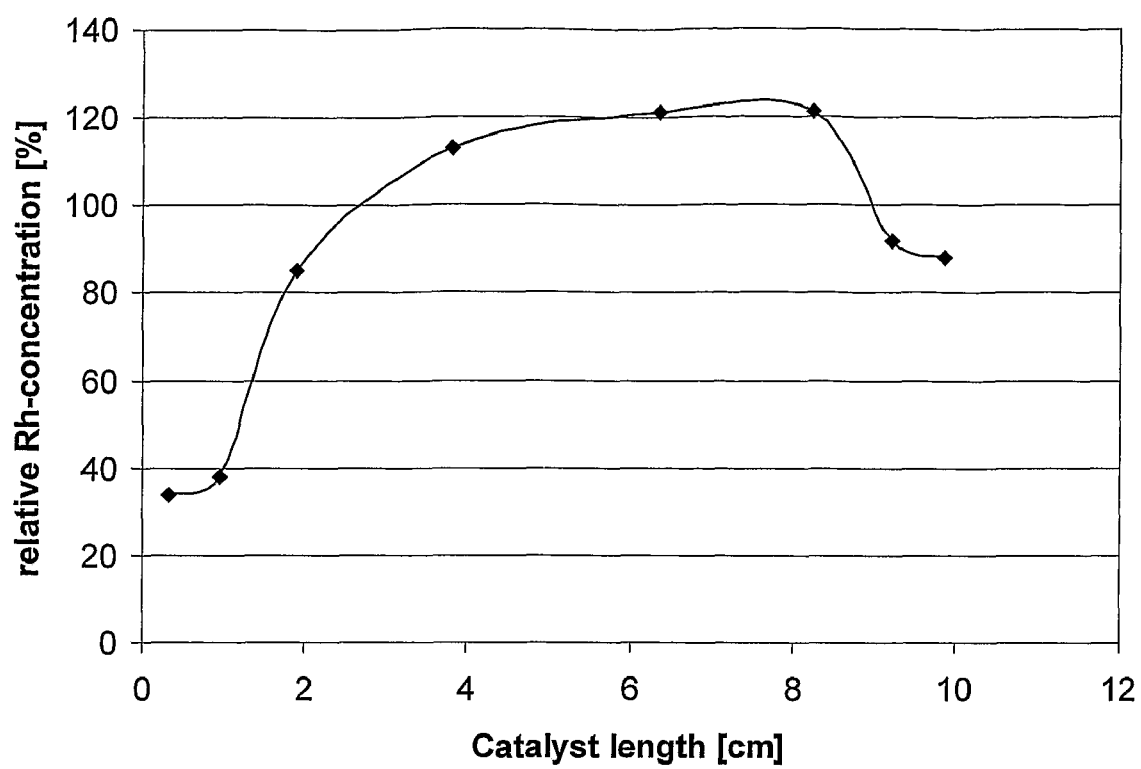
FIG. 5: Concentration profile of palladium in a single layer palladium gradient catalyst of example 2

The concentration profiles given in the FIGS. 3 to 5 were determined with semi-quantitative XRF-analysis. For that purpose 1.252 cm (half inch) thick slices were cut from the catalysts at the positions given in the figures. These slices were then milled to yield a powder for XRF-analysis. The concentrations in FIGS. 3 to 5 are given as relative values based on the average concentration of the entire catalyst.

Example 2

Preparation of a Single Layer Catalyst with a Palladium Gradient.

A monolithic honeycomb carrier with a total length of 76,2 mm (3 inch) was coated with an alumina based precious metal free washcoat, dried at 120° C. and calcined at 500° C. in air. Subsequently, the first 15,2 mm (0,6 inch) from the upstream end as well as the first 25,4 mm (1 inch) from the downstream end were dipped into a solution of polyethylene glycol. Thereafter in a first impregnation step 45,7 mm (1,8 inch) from the upstream end of the substrate were impregnated with a palladium tetraammine nitrate solution and immediately dried in a continuous air stream at 120° C. After this, in a second impregnation step 45,7 mm (1,8 inch) from the downstream end were impregnated with the palladium tetraammine nitrate solution and dried as described above. The substrate was loaded with 120 g/l washcoat and 1,41 g/l palladium. The resulting palladium profile is shown in FIG. 4.

Example 3

Preparation of a Single Layer Catalyst with a Rhodium Gradient.

A monolithic honeycomb carrier with a total length of 101,6 mm (4 inch) was coated with an alumina based precious metal free washcoat, dried at 120° C. and calcined at 500° C. in air. Subsequently, the first 15,2 mm (0,6 inch) from the upstream end as well as the first 15,2 mm (0,6 inch) from the downstream end were dipped into a solution of polyethylene glycol. Thereafter the complete substrate was impregnated with a rhodium nitrate solution and immediately dried in a continuous air stream at 120° C. to obtain the desired concentration profile of the rhodium as presented in FIG. 5. The substrate was loaded with 120 g/l washcoat and 0,706 g/l rhodium.

Example 4

A double layer catalyst for TWC application was prepared. The catalyst had a palladium gradient in the first layer and a second layer containing homogeneously distributed rhodium and platinum.

To a monolithic honeycomb carrier coated with a first (inner) layer prepared as described in example 1 a second (outer) layer comprising a complete three way formulation was added. Besides stabilized alumina and an oxygen storage component the second layer contained 0,071 g/l platinum and 0,177 g/l rhodium. The total washcoat uptake of the second layer was 125 g/l.

Example 5

Homogeneously Coated Catalyst for Comparison to Example 4

A double layer catalyst for TWC application was prepared, in which the first layer contained homogeneously distributed palladium and the second layer homogeneously distributed rhodium and platinum.

A monolithic carrier was coated with a palladium containing alumina based washcoat. The total washcoat uptake of the first (inner) layer was 120 g/l and the 1,41 g/l palladium were homogeneously distributed. After drying and calcination at 500° C. in air a second (outer) layer prepared as described in example 4 was added.

Evaluation of Example 4 and Example 5

The catalytic activity of the two catalysts were compared in a vehicle test. The relative emissions observed in an FTP test cycle are shown in the table below where the emissions of the homogeneously coated catalyst (example 5) were set to 100%. The catalysts had been aged in an internal combustion engine with a procedure corresponding to a normal driving cycle of 160000 kilometers (100000 miles).

TABLE

Comparison of catalyst activities

| | PGM*) profile 1. Layer | PGM profile 2. Layer | HC [%] | CO [%] | NOx [%] |
|---|---|---|---|---|---|
| Example 5 | homogeneous | homogeneous | 100 | 100 | 100 |
| Example 4 | gradient | homogeneous | 78 | 85 | 101 |

*)PGM = Platinum Group Metal

The data of the table show that the catalyst of example 4 featuring a gradient palladium concentration with low palladium concentration at the entrance of the catalyst exhibits considerably lower emissions of hydrocarbons (HC) and carbon monoxide (CO) after engine aging than the homogeneous counterpart of example 5.

What is claimed is:

1. An exhaust gas cleaning catalyst comprising a catalytic coating on a honeycomb carrier, said honeycomb carrier having an upstream end and a downstream end and a plurality of flow channels running from the upstream end to the downstream end, wherein the catalytic coating comprises at least one catalytically active precious metal component which exhibits a continuously varying concentration profile along the axis of the honeycomb carrier wherein the honeycomb carrier is distinguished into three abutting regions with a low concentration in the first or upstream region at the inlet face of the carrier and with a steep increase to a peak concentration in the second or intermediate region and a third concentration in the third or downstream region which is equal to or lower than the peak concentration in the second region.

2. Exhaust gas cleaning catalyst according to claim 1 wherein the total length of the honeycomb carrier is from 30 to 300 mm and the first region has a length of from 5 to 20 mm and the second region has a length of from 10 to 100 mm abutting to the first region.

3. Exhaust gas cleaning catalyst according to claim 2, wherein the average concentration of the precious metal component with continuously varying concentration profile in the first region is of from 10 to 80% of the maximum concentration in the second region and the average concentration in the third region is of from 0 to 100% the maximum concentration in the second region.

4. Exhaust gas cleaning catalyst according to claim 3, wherein the concentration of precious metal is constant within the third region.

5. Exhaust gas cleaning catalyst according to claim 3, wherein the precious metal component with continuously varying concentration profile is palladium and its peak concentration in the second region is from 0,1 to 100 g/l of volume of the honeycomb carrier.

6. Exhaust gas cleaning catalyst according to claim 1, wherein the catalytic coating further comprises additional precious metal components selected from the group consisting of platinum, rhodium, iridium and mixtures thereof.

7. Exhaust gas cleaning catalyst according to claim 6, wherein the catalytic coating comprises palladium and the additional precious metal components exhibit a same concentration profile as a palladium concentration profile, but with different absolute concentrations.

8. Exhaust gas cleaning catalyst according to claim 6, wherein the additional precious metal components have the same constant concentration within all three regions of the catalyst.

9. Exhaust gas cleaning catalyst according to claim 8, wherein the additional precious metal components are platinum and rhodium with platinum and rhodium being present in a concentration of from 0,05 to 5 g/l volume of the honeycomb carrier.

10. Exhaust gas cleaning catalyst according to claim 9, wherein the catalytic coating with the varying concentration profile forms a first coating on top of which is provided a second catalytic coating and said second catalytic coating comprises the additional precious metal components with constant concentration along the honeycomb carrier.

11. Process for manufacturing an exhaust gas cleaning catalyst according to claim 1, comprising
   a) coating a honeycomb carrier with a slurry comprising at least one high surface area support material for the precious metal component, drying and calcining this coating to obtain a support layer,
   b) wetting the first region of the carrier with a wetting agent,
   c) impregnating the first and second region of the carrier with a solution of at least one precursor compound of the precious metal component,
   d) drying the impregnated support layer by conducting a stream of heated air through the honeycomb carrier, thereby forming a continuous concentration profile with a low precious metal concentration at the upstream side, and
   e) calcining and optionally reducing the precious metal component in a hydrogen containing gas stream.

12. Process according to claim 11, wherein the wetting agent is water or an aqueous solution of an organic compound.

13. Process according to claim 12, wherein the wetting agent is an aqueous solution of an organic compound selected from the group consisting of polyethylene glycol, citric acid, polyvinyl alcohol, isopropanol or mixtures thereof.

14. Process according to claim 11, wherein the impregnation solution contains a poorly adsorbing precursor of the precious metal component.

15. Process according to claim 14, wherein the poorly adsorbing precursor compound is palladium tetraammine nitrate Pd $(NH_3)_4(NO_3)_2$.

16. Process according to claim 11, wherein the impregnation solution contains a strongly adsorbing precursor of the precious metal component.

17. Process according to claim 16, wherein the strongly adsorbing precursor compound is palladium nitrate $Pd(NO_3)_2$.

18. Process for manufacturing an exhaust gas cleaning catalyst according to claim 1, comprising
   a) coating a honeycomb carrier with a slurry comprising at least one high surface area support material and a precious metal component, drying and calcining this coating to obtain an already catalytically activated support layer,
   b) wetting the first region of the carrier with a wetting agent,
   c) impregnating the first and second region of the carrier with a solution of at least one precursor compound of the precious metal component,
   d) drying the impregnated support layer by conducting a stream of heated air through the honeycomb carrier, thereby forming a continuous concentration profile with a low precious metal concentration at the upstream side, and
   e) calcining and optionally reducing the precious metal component in a hydrogen containing gas stream.

19. Process for manufacturing an exhaust gas cleaning catalyst according to claim 1, comprising
   a) coating a honeycomb carrier with a slurry comprising at least one high surface area support material for the precious metal component, drying and calcining this coating to obtain a support layer,
   b) wetting the first and the third region of the carrier with a wetting agent,
   c) impregnating either the complete carrier with a solution of at least one precursor compound of the precious metal component in one step, or in a first impregnation step the first and second region and in a second impregnation step the third and the second region of the carrier,
   d) drying the impregnated support layer by conducting a stream of heated air through the honeycomb carrier, thereby forming a continuous concentration profile with a low precious metal concentration at the upstream side, and
   e) calcining and optionally reducing the precious metal component in a hydrogen containing gas stream.

* * * * *